G. E. WOOD.
TOOL HANDLE.
APPLICATION FILED NOV. 19, 1906.
913,339.
Patented Feb. 23, 1909.
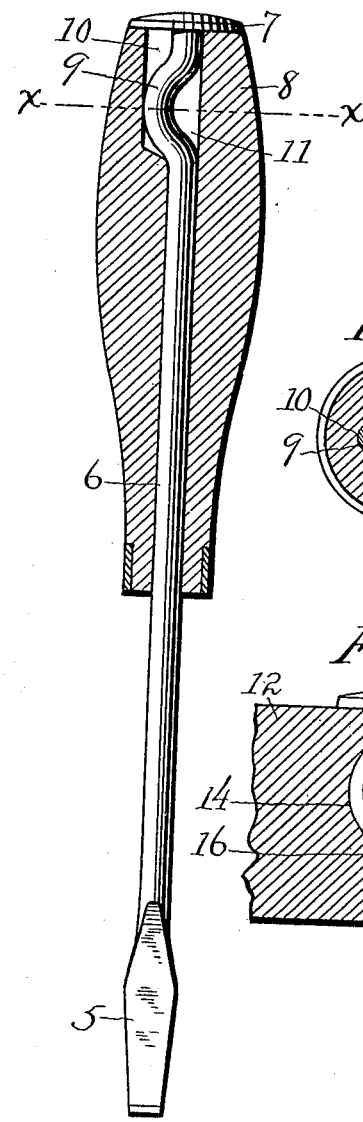
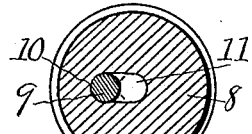
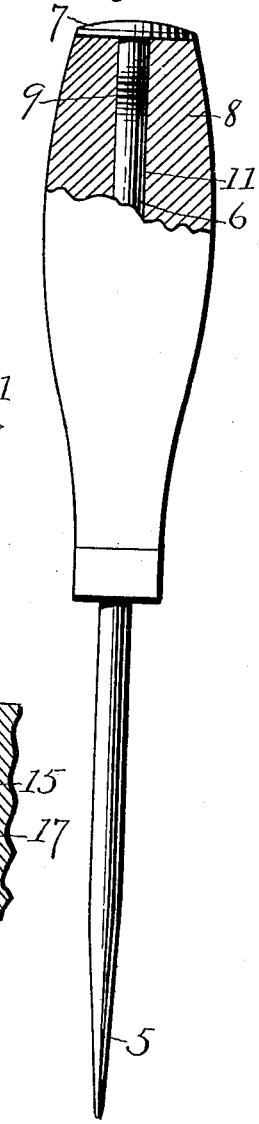
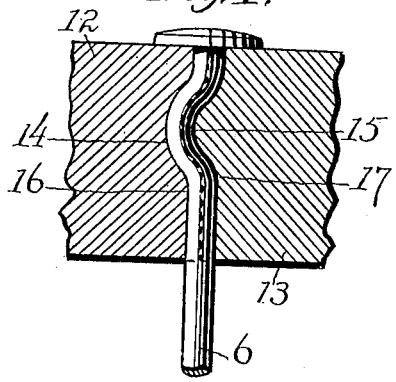
Witnesses:
F. H. Elliott
L. E. Birkovitch
Inventor:
George E. Wood,
by Arthur B. Jenkins,
Attorney.
THE NORRIS PETERS CO., WASHINGTON, D. C.

UNITED STATES PATENT OFFICE.

GEORGE E. WOOD, OF SOUTHINGTON, CONNECTICUT.

TOOL-HANDLE.

No. 913,339.  Specification of Letters Patent.  Patented Feb. 23, 1909.

Application filed November 19, 1906. Serial No. 343,953.

*To all whom it may concern:*

Be it known that I, GEORGE E. WOOD, a citizen of the United States, and a resident of Southington, in the county of Hartford and State of Connecticut, have invented a new and Improved Tool-Handle, of which the following is a specification.

My invention relates to the class of hand tools embodying a blade having an integrally formed shank of metal, to which shank a handle of fibrous material is secured, and the object of my invention is to provide a tool of this class having means for effectually securing the handle against turning movement on the shank; and a further object of the invention is to provide means for quickly and cheaply forming the shank of the tool with such means to prevent turning movement of the handle; and a further object of the invention is to provide a structure in which the handles may be secured in place with little liability of destruction in the operation of assembling the parts. A form of tool in the use of which these objects may be attained is illustrated in the accompanying drawings, in which—

Figure 1 is a view in central longitudinal section through the handle of a tool embodying my invention. Fig. 2 is a view, partially in side elevation, of a tool embodying my invention, with the upper part of the handle broken away showing the upper portion of the shank in a plane at right angles to the plane of view of Fig. 1. Fig. 3 is a view in cross-section through the handle and shank on the line *x*—*x* of Fig. 1. Fig. 4 is a detail view showing the manner of forming the shank.

In the accompanying drawings the numeral 5 denotes the blade of a tool, as a screw driver, chisel or the like, a screw driver having been chosen in the present case for the purpose of illustrating the invention. The shank 6 of round or similar form in cross-section constitutes an integral part of the blade, the latter in fact being drawn from a rod of stock of the size and form of the shank. A head 7 is formed at the end of the shank, this head lying against the end of the handle 8, that is preferably formed of fibrous material. This head is usually formed by "heading over" the end of the shank as by means of a die while the shank, at a proper distance from the end to allow such heading, is securely clamped and held between the two dies.

In carrying out my invention I form an offset bend 9 in the shank and provide a recess 10 opening laterally out of the central hole 11 through the handle, this offset portion 9 being located within the recess 10. The recess 10 may be formed by boring a second hole into the end of the handle at such point that it will cut or open into the central bore or hole 11.

The preferred manner of constructing the offset 9 consists in providing the dies 12—13, that are used to clamp the shank while the head is being formed, the one with a depression 14 and the other with an enlargement 15 to fit said depression, the projection and depression having grooves 16—17, of a size in cross-section practically equal to or slightly larger than the shank of the tool. As the dies are brought together to clamp the shank for the heading operation the bend or offset 9 is formed, and it will be seen that no extra operation is required to thus form the shank. The recess 10 is of a size to snugly receive the offset and there is thus no liability of splitting or breaking the handle in inserting the shank through the central opening therein. The shank is thus, without any other operation than that required to head it, provided with extremely efficient means for securing the handle against turning movement, and the means thus provided are such as to practically prevent the breaking of handles in the operation of securing them to the shank. If in boring the hole forming the recess 10 a slight rib should be left between this recess and the central opening this will be easily sheared off as the shank is driven to place, there being sufficient unoccupied space to receive the portions thus sheared off.

What I claim as my invention and desire to secure by Letters Patent is:—

1. A hand tool including a blade, a shank having a bent portion between its extremities to form an offset, and a handle having an opening to receive and closely fit said shank, and a recess to receive said offset.

2. A hand tool including a blade, a shank secured thereto and extending in a straight line therefrom and bent between its extremities to form an offset, a head formed on the end of the shank, and a handle underlying said head and having an opening to receive and closely fit said shank and a recess communication with the said opening to receive said offset.

3. A hand tool including a blade, a shank secured thereto straight as to its greater portion but being bent laterally near its upper end to form an offset, and a handle having an opening to receive said shank and a recess formed laterally therefrom and extending to the end of the handle to receive said offset.

4. A hand tool including a blade, a shank secured thereto straight as to its greater portion but bent between its extremities to form an offset portion, a head formed on the end of the shank, and a handle underlying said head and having an opening to receive said shank and a laterally formed recess extending to the end of the handle to receive said offset portion in the operation of assembling the parts.

GEORGE E. WOOD.

Witnesses:
    AUGUSTINE M. LEWIS,
    GEORGE B. MESEROLE.